United States Patent
Erickson

(10) Patent No.: US 9,536,337 B1
(45) Date of Patent: Jan. 3, 2017

(54) RESTORING DIGITAL IMAGE NOISE LOST IN A BLUR

(71) Applicant: ADOBE SYSTEMS INCORPORATED, San Jose, CA (US)

(72) Inventor: Alan Lee Erickson, Highlands Ranch, CO (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 0 days.

(21) Appl. No.: 14/923,023

(22) Filed: Oct. 26, 2015

(51) Int. Cl.
*G06K 9/40* (2006.01)
*G06T 11/60* (2006.01)
*G06T 5/00* (2006.01)

(52) U.S. Cl.
CPC .............. *G06T 11/60* (2013.01); *G06T 5/003* (2013.01); *G06T 2207/10024* (2013.01)

(58) Field of Classification Search
CPC . G06T 11/60; G06T 5/003; G06T 2207/10024
See application file for complete search history.

(56) References Cited

U.S. PATENT DOCUMENTS

| 9,237,257 | B1 * | 1/2016 | Szedo | H04N 5/142 |
| 2012/0087552 | A1 * | 4/2012 | Lee | G06K 9/00275 |
| | | | | 382/118 |
| 2015/0262339 | A1 * | 9/2015 | Mori | G06T 5/002 |
| | | | | 348/241 |

* cited by examiner

*Primary Examiner* — Phuoc Tran
(74) *Attorney, Agent, or Firm* — Shook Hardy & Bacon L.L.P.

(57) ABSTRACT

Embodiments of the present invention provide systems, methods, and computer storage media directed to restoring digital image noise lost in a blur process. In one embodiment, a noise reduction factor is calculated for each pixel of the digital image that has had a blur applied thereto. The noise reduction factor for a respective pixel is indicative of an estimated reduction in noise resulting from an amount of blur applied to the respective pixel. A noise compensation value can then be determined for each of the pixels, based on the noise reduction factor calculated for each of the pixels and a target noise level for the digital image as a whole. Once the noise compensation value is determined, noise can be applied to each of the plurality of pixels in accordance with the determined noise compensation value. Other embodiments may be described and/or claimed.

20 Claims, 5 Drawing Sheets

US 9,536,337 B1

RESTORING DIGITAL IMAGE NOISE LOST IN A BLUR

BACKGROUND

Digital images of an object or scene that have been captured, for example, via a digital camera or a scanner, generally include an amount of noise that is encoded within the digital image. Noise, such as Gaussian noise, within a digital image can generally be described as a random plus or minus deviation at each pixel location of the digital image. This random plus or minus deviation is often introduced into the digital image via the sensor that is utilized to capture the digital image and can be affected by poor illumination of the object or scene, temperature of the sensor at the moment when the object or scene is captured, electronic noise within the circuit that is utilized to capture the digital image, etc. A common source of noise in a reasonably exposed image is shot noise, which is an unavoidable phenomenon due to the nature of converting incoming light into an electrical charge on the image sensor. While noise is generally considered undesirable, the human eye has come to expect noise within a captured digital image and can readily discern when the noise across an image varies or strays from an amount of noise expected.

When a digital image is blurred, for example utilizing a graphics editor to apply a blur to the digital image, the amount of noise within the digital image is reduced in correlation with how much the digital image is blurred. Current blur techniques can result in a spatially varying blur across a digital image such that the amount of blur varies from one portion of the digital image to another. As a result, the noise that occurs across the digital image would also vary, which, as mentioned previously, is readily discernable to the human eye and generally detracts from the aesthetics of the object or scene depicted by the digital image.

While there are various techniques that have been developed for adding noise back into a digital image that has been blurred, none of these techniques accurately account for the amount of noise lost during the blur process, nor do they accurately account for how noise behaves when adding noise back into the digital image.

SUMMARY

Embodiments of the present invention are directed at systems, methods, and computer storage media for accurately restoring digital image noise lost in a blur process. In some embodiments, a process for restoring digital noise lost in a blur process can begin by calculating a noise reduction factor for each pixel of a digital image that has had a blur applied thereto. The noise reduction factor for each pixel is indicative of an estimated reduction in noise that resulted from an amount of blur applied to the respective pixel. Once the noise reduction factor has been calculated for each pixel, the noise reduction factor for each pixel and a target noise level for the digital image as a whole can be utilized to determine a noise compensation value for each of the pixels. The noise compensation value for each pixel can then be utilized to accurately apply noise to each of the pixels in order to restore the noise lost during the blurring process and to achieve a consistent amount of noise across the digital image, thereby satisfying what the human eye is expecting.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

DETAILED DESCRIPTION

As mentioned previously, while noise is generally considered undesirable, the human eye has come to expect noise within captured digital images and can readily discern when the noise across an image varies or strays from an amount of noise expected. As such, a certain amount of consistent noise within a digital image is desirable.

When a digital image is blurred, the amount of noise within the digital image is reduced in correlation with the amount of the blur that is applied to the digital image. In addition, current blur techniques can result in a spatially varying blur across a digital image such that the amount of blur varies from one portion of the digital image to another. As a result, the noise that occurs across the digital image would also vary, which, as mentioned previously, is readily discernable to the human eye and generally detracts from the aesthetics of the object or scene depicted by the digital image.

While there are various techniques that have been developed for adding noise to a digital image that has been blurred, none of these techniques accurately account for the amount of noise lost during the blur process, nor do they accurately account for how noise behaves when adding noise back into the digital image.

Embodiments of the present invention are directed at systems, methods, and computer storage media for accurately restoring digital image noise lost in a blur process. In some embodiments, a process for restoring noise lost in a blur process can begin by calculating a noise reduction factor for each pixel of a digital image that has had a blur applied thereto. The noise reduction factor for each pixel is indicative of an estimated reduction in noise that resulted from an amount of blur applied to the respective pixel. In some embodiments, this calculation can be based on a root of a sum of squares equation that can accurately estimate the amount of noise that is lost as a result of the amount of blur applied to an individual pixel. The noise reduction factor for each pixel can be combined with a value for the original amount of noise encoded in the digital image to determine the amount of noise that remains encoded within the pixel.

Once the noise reduction factor has been calculated for each pixel, the noise reduction factor for each pixel and a target noise level for the digital image as a whole can be utilized to determine a noise compensation value for each of the pixels. The noise compensation value is indicative of an amount of noise that is to be added to each pixel to achieve the target noise level. The noise compensation value for each pixel can then be utilized to accurately apply noise to each of the pixels of the digital image to restore the amount of noise lost.

Figure 1:
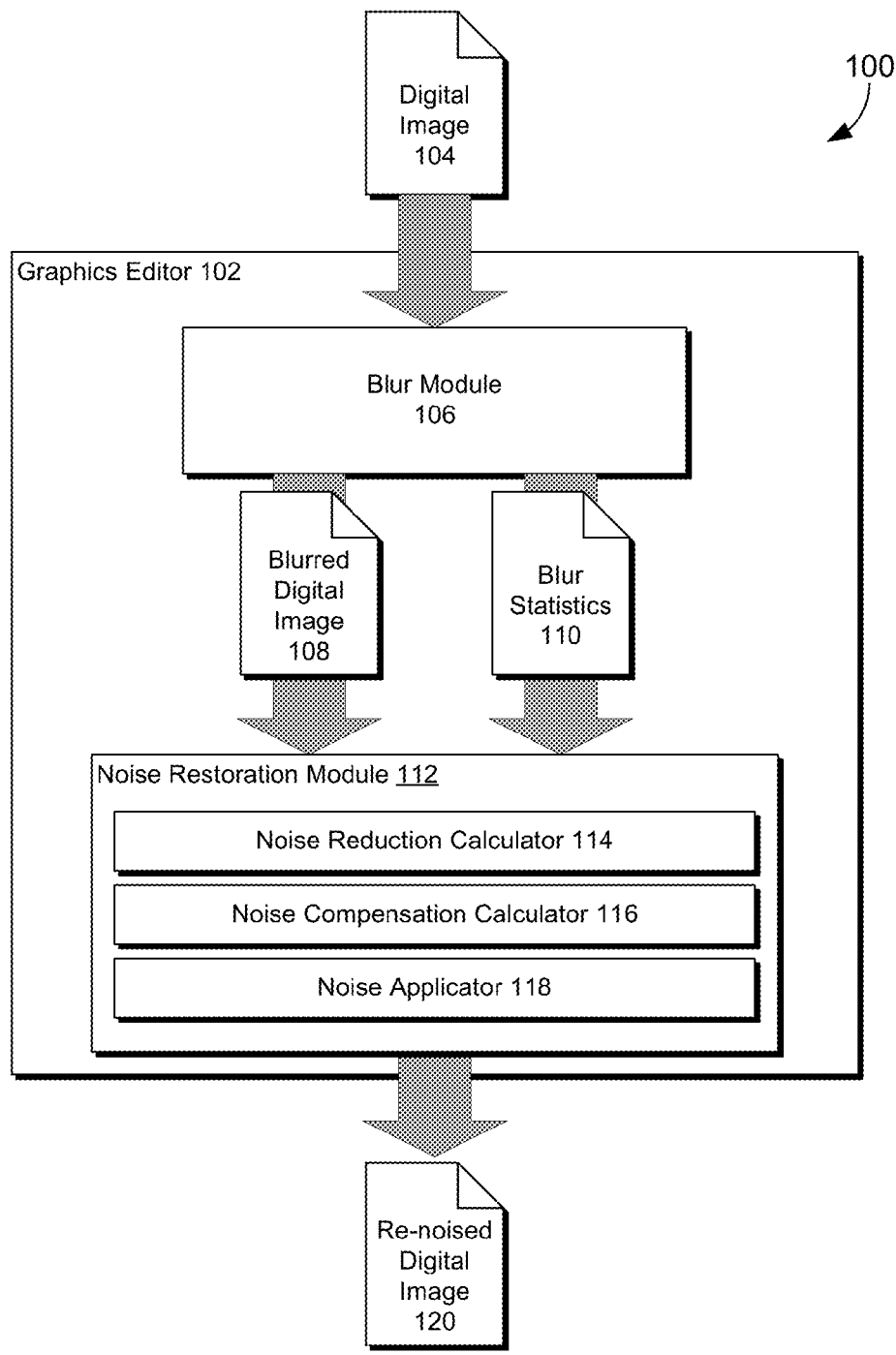
FIG. 1 depicts aspects of an illustrative graphics editing system in accordance with various embodiments of the present disclosure.

FIG. 1 depicts aspects of an illustrative graphics editing environment 100 in accordance with various embodiments of the present disclosure. As depicted, graphics editing environment 100 includes a graphics editor 102. Graphics editor 102 can be any suitable graphics editor, such as, for example, ADOBE® Illustrator or ADOBE® Photoshop (both available from Adobe Systems Inc. of San Jose, Calif.). Graphics editor 102 can be configured to provide, among other things, a user interface that facilitates a user of graphics editor 102 in manipulating a digital image, such as, for example, digital image 104.

Digital image 104 represents an image (e.g., of a scene or an object) that is stored in a digital format. Such a digital format could be, for example, a Joint Photographic Experts Group (JPEG) format, a Bitmap (BMP) format, a Tagged Image File Format (TIFF), a Portable Networks Graphic (PNG) format, A Graphics Interchange Format (GIF), or any other suitable format. Digital image 104 can be stored digitally as an array of pixels that depict the object or scene captured by the digital image. Each of these pixels would be assigned certain information, such as, for instance, color information. For example, in some embodiments, each pixel is assigned a value in the red, green, blue (RGB) color domain. The RGB color domain, also referred to in the art as the RGB color model, is an additive representation of a color. In the RGB color domain, each pixel would be assigned a color by assigning an amount of red, green, and blue to the respective pixel, hereinafter referred to as an RGB color value. The combination of this RGB color value would represent the color of the pixel within the digital image. It will be appreciated that the RGB color domain is merely meant to be an example of a possible color domain and that the teachings of this disclosure could be applied to any color domain, or representation of color, without departing from the scope of this disclosure.

In embodiments, digital image 104 is produced, or captured, by a digital image capture device. Such a digital image capture device could be, for example, a document scanner, a digital camera (video or still), or any other suitable digital image capture device. As mentioned previously the digital image capture device that is utilized to capture digital image 104 can encode noise within digital image 104 that was produced by the digital image capture device when capturing the digital image. This noise can be affected by, for example, poor illumination of the object or scene when the digital image was captured; temperature of one or more sensors, utilized to capture the digital image, at the moment when the object or scene is captured; electronic noise within the circuit that is utilized to capture the digital image; etc. A common source of noise in a reasonably exposed image is shot noise, which is an unavoidable phenomenon due to the nature of converting incoming light into an electrical charge on the image sensor. The noise is encoded within digital image 104 as random plus or minus deviations of, for example, the RGB color value, at each pixel location of the digital image 104. Noise within a digital image can cause the digital image to appear grainy. This grainy appearance is how the human eye perceives the noise that is encoded within the digital image 104.

The noise encoded within digital image 104 can be apportioned into two categories of noise. The first category can be referred to as a luminance noise and the second category can be referred to as color noise. Luminance noise refers to noise that effects the brightness of a pixel. As such, luminance noise affects each of the red, green, and blue values within the RGB color value of a pixel equally. Color noise, on the other hand, affects the red, green, and blue values within the RGB color value of a pixel individually and in an unequal manner. As such, color noise can cause a variation to a color of a pixel. As used herein, reference to noise, in general, is intended to include both of these categories of noise unless the context clearly indicates otherwise.

An amount of noise within a digital image can be indicated by a standard deviation across the digital image. This is commonly referred to in the art as noise sigma (a). The higher the standard deviation, the more noise that is present in the digital image. Conversely, the lower the standard deviation, the lower the amount of noise is in the digital image. In general, the noise sigma can be considered to be uniform across a digital image. While the noise sigma can generally be considered to be uniform across a digital image, in some instances, the noise sigma can include some variance between light and dark regions of the digital image. At the time of exposure, lighter areas can have a higher noise sigma, due to shot noise, but in the course of initial processing of the digital image the noise sigma can become more uniform between dark and light areas. This processing is generally, although not always, accomplished within the image capture device except for instances where images are maintained in a raw format on the image capture device. Raw image formats are known in the art and will not be discussed any further herein. In some instances, via the previously mentioned processing, the lighter areas (e.g., highlights) of a digital image may even come to have smaller noise sigmas compared to darker areas. For purposes of the present disclosure, a single noise sigma is assumed for the entire image. As will be described later in reference to highlights, a mechanism can be provided to accommodate a lesser noise sigma in the lighter areas, as compared to the darker areas.

Graphics editor 102 includes a blur module 106 that is configured to apply a blur to a digital image that is being edited within graphics editor 102, such as, for example, digital image 104. Blur module 106 can be configured to take digital image 104 as input and can apply a selected blur to the digital image. Such a blur could be, for instance, a blur that produces uniform blurring across digital image 104, such as, for example, a box blur, or a blur that produces a varied blurring across digital image 104, such as, for example, an iris blur.

Figure 2:
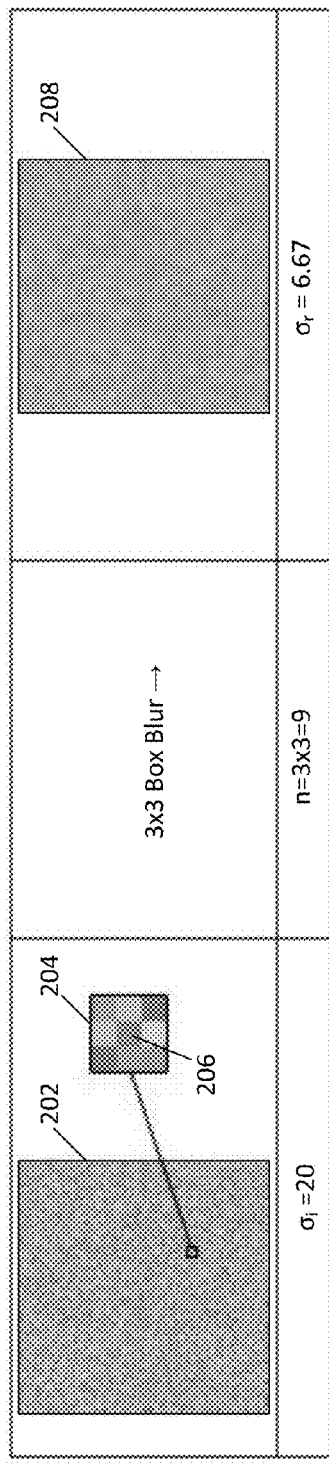
FIG. 2 depicts an illustrative box blur being applied to a digital image, in accordance with various embodiments of the present disclosure.
Figure 3:
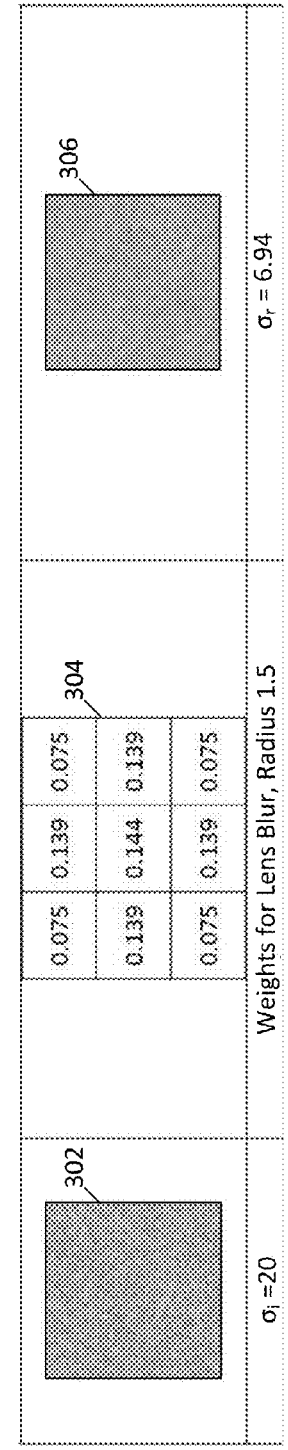
FIG. 3 depicts an illustrative lens blur being applied to a digital image, in accordance with various embodiments of the present disclosure.
Figure 4:
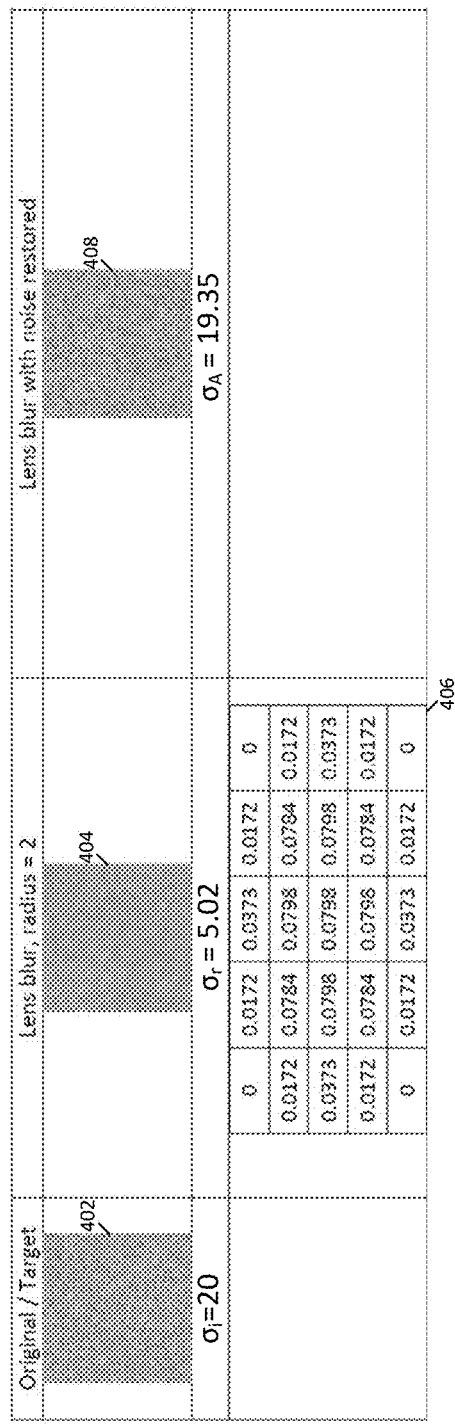
FIG. 4 depicts another illustrative lens blur being applied to a digital image along with a re-noised version of the digital image, in accordance with various embodiments of the present disclosure.

To accomplish this blurring, blur module 106 can be configured to define a blur neighborhood, or blur kernel, for each pixel that is to be blurred within the digital image. The blur neighborhood identifies a neighborhood, or grouping, of pixels within digital image 104 whose values (e.g., RGB values) are to be averaged together to provide a new, or blurred, value (e.g., RGB value) for a selected pixel. Illustrative blur neighborhoods are depicted in FIGS. 2-4, and discussed in greater detail below. The blurred value for the selected pixel represents the value (e.g., RGB value) assigned to the individual pixel in the resulting blurred digital image 108. It will be appreciated that, as more pixels are included within a blur neighborhood the greater the amount of blur that will result. In addition, in embodiments where a spatially-varying blur is applied, the blur neighborhoods can vary from pixel to pixel in order to produce the spatially-varying blur.

Each of the pixels within the blur neighborhood of the selected pixel can be considered a different source, of both noise and signal. By averaging these different sources together to arrive at the blurred value for a selected pixel, the amount of noise is reduced. The amount of reduction in noise can be accurately estimated utilizing a root of the sum of squares calculation. For instance, where pixels $p_1$ to $p_n$, each including an amount of noise, subject to noise deviation, represented by $\sigma_1$ to $\sigma_n$, respectively, are averaged together, the remaining amount of noise from this averaging can be accurately estimated utilizing the equation:

$$\frac{\sqrt{\sigma_1^2 + \sigma_2^2 + \ldots + \sigma_n^2}}{n},$$

where n represents the number of pixels in the blur neighborhood. As an example, suppose the values for two pixels that are subject to a noise deviation of $\sigma=20$ are averaged together to produce a blurred value, then the resulting noise in the averaged value can be approximated by the calculation:

$$\frac{\sqrt{20^2 + 20^2}}{2} = 14.142.$$

In addition, where, as in the previous example, the individual pixels within the blur neighborhood for a selected pixel are assumed to be subject to the same noise deviation and contribute equally to the blurred RGB value of the selected pixel (e.g., for the box blur depicted in FIG. 2), the following equation can be derived:

$$\sigma_r = \frac{\sigma_i}{\sqrt{n}},$$

where $\sigma_r$ represents the remaining amount of noise; $\sigma_i$ represents the input amount of noise, or input sigma, for the different sources; and n, again, represents the number of sources. This equation is based on the above discussed root of the sum of squares equation. In addition, this equation can be viewed as two parts, the first is the input sigma, $\sigma_i$, or original noise assumed to be contained, or encoded, within the selected pixel. The other part can be considered a noise reduction factor and is represented by $$\frac{1}{\sqrt{n}}$$

in this equation. As used herein, a noise reduction factor refers to a portion of an equation that, when multiplied by an input, or target, sigma produces an estimate for the amount of noise remaining in the selected pixel. Utilizing this equation in the above example we arrive at the same amount of noise remaining, $$\sigma_r = \frac{20}{\sqrt{2}} = 14.142.$$

It will be appreciated that, because the noise across an image is represented by random plus or minus deviations from the value (e.g., RGB value) of each pixel, it can be assumed that each pixel within an image is subject to the same noise deviation. As such, the above equation can be utilized to estimate the amount of noise remaining within a selected pixel where each individual pixel within the blur neighborhood of that selected pixel contributes equally to the blurred RGB value for the selected pixel.

In some embodiments, each pixel within the blur neighborhood for a selected pixel is assigned a weight that indicates how much the value for each individual pixel in the blur neighborhood contributes to the resulting blurred value for the selected pixel. In such embodiments, where the weights have been normalized (e.g., the sum of the weights is 1) the following equation can be derived:

$$\sigma_r = \sigma_i * \sqrt{w_1^2 + w_2^2 + \ldots + w_n^2},$$

where, again, $\sigma_r$ represents the remaining amount of noise; $\sigma_i$ represents the input amount of noise, or input sigma, for the various sources; n represents the number of sources; and w represents the respective weight of each source. In this equation, the calculation of $$\sqrt{w_1^2 + w_2^2 + \ldots w_n^2}$$

can be referred to as a noise reduction factor because, when multiplied by the input sigma, this calculation produces a value for the remaining amount of noise. Again, this equation is based on the above discussed root of the sum of squares equation. Examples of such a blur neighborhood are depicted in FIGS. 3 and 4, and discussed in greater detail below. For non-normalized weights the root of the sum of squares of the weights can be divided by the sum of the weights, which would yield the equation $$\sigma_r = \sigma_i * \frac{\sqrt{w_1^2 + w_2^2 + \ldots w_n^2}}{\sum_{i=1}^{n} w_i}.$$

In this equation, the portion $$\frac{\sqrt{w_1^2 + w_2^2 + \ldots w_n^2}}{\sum_{i=1}^{n} w_i}$$

can be referred to as the noise reduction factor because, when multiplied by the input sigma, this portion of the equation produces a value for the remaining amount of noise.

In all of the equations above, the amount of noise remaining in a blurred value for a selected pixel can be correlated with the amount of blur applied to that pixel. Also, as mentioned previously, the amount of blur applied to a selected pixel is dependent on the number of pixels that are included within the blur neighborhood of that selected pixel. As such, it follows that, the amount of noise remaining in a blurred value for a selected pixel correlates with the number of pixels that are included within the blur neighborhood. Because of this, it will be appreciated that, in embodiments where the blur varies across the blurred image, the number of pixels included in each blur neighborhood will also vary, and so too will the remaining amounts of noise for each individual pixel. As mentioned previously, the human eye has come to expect noise within a digital image and can particularly spot a region of the digital image where the noise differs from that of another region of the digital image. As a result, varying amounts of noise in a digital image can be aesthetically displeasing or can distract from the underlying object or scene captured within the digital image. Consequently, it is important to restore noise that is lost during the process of blurring a digital image to have a consistent and expected amount of noise across the digital image as a whole.

The output of blur module 106 can include blurred digital image 108 and blur statistics 110. Blurred digital image 108 represents digital image 104 having had a blur applied thereto by blur module 106. Blur statistics can include any information related to the blur that was applied to digital image 104 to produce blurred digital image 108. In some embodiments, this information could indicate an amount of blur applied to each individual pixel of the blurred digital image 108. In such embodiments, blur statistics could include the blur neighborhoods for each pixel that would be representative of the amount of blur applied to each individual pixel. In other embodiments, blur statistics 110 could indicate an amount of noise remaining at each pixel location as a result of the blur applied thereto. In such embodiments, blur module 106 would be configured to calculate the remaining amount of noise in accordance with the equations described above. In addition, blur statistics could also include an original noise sigma for digital image 104 that is indicative of an amount of noise that was contained in digital image 104 prior to the application of the blur by blur module 106 to produce blurred image 108.

As depicted, both the blurred digital image 108 and the blur statistics 110 can be output to noise restoration module 112, of graphics editor 102. Noise restoration module 112 can be configured to restore noise to blurred digital image 108 to produce re-noised digital image 120. To accomplish this, noise restoration module 112 is depicted as including three components, a noise reduction calculator 114, a noise compensation calculator 116, and a noise applicator 118.

Noise reduction calculator 114 can be configured to receive at least the blur statistics 110 that were produced by blur module 106. In embodiments where the blur statistics 110 include the blur neighborhoods that were utilized to calculate the blurred value for each pixel, noise reduction calculator 114 can be configured to utilize these blur neighborhoods to calculate the amount of noise remaining at each pixel location within the blurred digital image 108 in accordance with the equations described above. In embodiments where the blur statistics 110 include an original noise sigma for digital image 104 this original noise sigma can be utilized as the input noise sigma ($\sigma_i$) from the equations above. The input noise sigma ($\sigma_i$) can also be referred to herein as a target noise sigma. In other embodiments, a noise sigma that is specified by a user of graphics editor 102 could be utilized as the input noise sigma ($\sigma_i$) from the equations above. In still other embodiments, noise reduction calculator 114 could be configured to utilize digital image 104 to calculate the input noise sigma ($\sigma_i$) for the equations above. It will be appreciated that, in embodiments where blur statistics 110 indicate an amount of noise remaining at each pixel location of blurred digital image 108, the noise reduction calculator 114 could be omitted from noise restoration module 112 and the processing could proceed to the noise compensation calculator 116.

Noise compensation calculator 116 can be configured to calculate an amount of noise to add to each pixel value to achieve the input noise sigma ($\sigma_i$), or target noise sigma. Such an amount is also referred to herein as a noise compensation value. In embodiments, noise compensation calculator 116 can be configured to take the amount of noise remaining at each pixel location as input, as well as the input noise sigma ($\sigma_i$) and can calculate an amount of noise that would need to be added to each pixel location to achieve the input noise sigma ($\sigma_i$). It is important to note that adding noise from different sources sums according to the root sum of squares. Because of this, the net effect of adding two different noise sources together results in some of the noise being cancelled. The amount of noise resulting from the summing of noise sources can be accurately estimated utilizing the equation $$\sigma_r = \sqrt{\sigma_1^2 + \sigma_2^2 + \ldots + \sigma_n^2},$$

where $\sigma_r$ is the resulting noise sigma, and n is the number of noise sources. As a result, it would not be accurate to merely take the difference between the input noise sigma ($\sigma_i$) and the amount of noise remaining at each pixel location to determine an amount of noise that would compensate for the amount of noise lost in the blur process utilized to produce blurred digital image 108.

As an example, suppose two pixels are being summed together, the first pixel subject to a noise sigma of 20 and the second pixel subject to a noise sigma of 10. The result of the summing of these two pixels would produce a pixel having noise defined by the equation: $\sigma_r = \sqrt{20^2 + 10^2} = 22.36$. As can be seen from this equation, the summing of these two pixels does not result in a pixel having a noise sigma of 30, as would be expected if the noise encoded within the two pixels summed without cancellation. Instead, the noise sigma resulting from the sum of the two pixels is 22.36. Because of the noise cancellation effect of summing noise sources, the amount of noise to add to each pixel can be calculated utilizing the following equation:

$$\sigma_A = \sqrt{\sigma_i^2 - \sigma_r^2},$$

where $\sigma_A$ represents the amount of noise that needs to be added; $\sigma_i$ represents the input noise sigma, or target noise sigma; and $\sigma_r$ represents the amount of noise remaining after a blur has been applied.

Once the noise compensation calculator 116 calculates the amount of noise to be added to achieve the input noise sigma for each pixel, this amount can be output to noise applicator 118 which can be configured to add the calculated amount of noise, $\sigma_A$, for each pixel. To accomplish the addition of the calculated amount of noise, a two dimensional noise buffer can be generated as random plus or minus values with a fixed standard deviation. The noise buffer can then be overlaid onto blurred digital image 108. In embodiments, the noise buffer is overlaid by, at each pixel location within blurred digital image 108, scaling the noise value from the noise buffer according to the calculated amount of noise for the respective pixel location. The scaled noise value is then added to the value (e.g., RGB value) of the pixel. As an example, suppose the noise buffer fixed standard deviation is 10, and at a given pixel location, the amount of noise to be added (as a standard deviation) is calculated as 20. The noise value from the corresponding location in the noise buffer is therefore scaled by 20/10.

As mentioned previously, noise within a digital image can be apportioned into two categories of noise, luminance noise and color noise. To apply pure luminance noise to a pixel, an equal amount is added to each of the color values of the pixel. For example, with respect to an RGB value of a pixel, the noise applicator would add the same amount to each of the red channel, the green channel, and the blue channel in order to add luminance noise to the pixel. As such, with the above discussed noise buffer, only luminance noise is added because there is no variance between the values for each of the color channels (e.g., red, green, and blue).

In some embodiments, it may be desirable to add color noise as well. In such embodiments, the amount of color noise can be represented, for example, by a percentage of noise that is desired to be color noise with the remaining percentage of noise being luminance noise. The percentage of color noise could be controlled programmatically or could be controlled by a user (e.g., through a slider within the user interface of the graphics editor 102). Regardless of whether the noise added is luminance noise or color noise, the total amount of noise applied by the noise applicator 118 should be the amount of noise calculated by noise compensation calculator 116, because this is the amount of noise calculated to achieve the input noise sigma, or target noise sigma.

To add color noise to a pixel, noise applicator 118 can be configured to add differing amounts to each of the color values of the pixel. To accomplish this, noise applicator can be configured to utilize multiple noise sources, one such noise source is represented by the two dimensional noise buffer discussed above, which can be utilized to add the percentage of luminance noise. This two dimensional noise buffer could be considered a master noise source. In addition to this master noise source, a two dimensional noise buffer for each color channel can also be utilized as color noise sources. When adding noise to a particular color channel of a pixel, the resulting noise added to the pixel is a blending of the master noise source with the respective two dimensional noise buffer for the particular color channel. This blending involves the summing of the noise from the master noise buffer with the noise from the respective two-dimensional buffer for the color channel. As previously discussed, when summing two noise sources, some noise cancellation occurs. This noise cancellation is most pronounced when equal amounts of luminance noise and color noise are added because both noise sources are contributing noise equally, and neither is dominating. Because the intent is for the total amount of noise applied by the noise applicator 118 to be the same amount of noise calculated by noise compensation calculator 116, a noise amplification factor may be necessary when adding both color noise and luminance noise to blurred digital image 108. This amplification factor can be represented by the equation $$A = \frac{1}{\sqrt{C^2 + (1-C)^2}},$$

where C is the percentage of color noise represented by the range 0 to 1. This amplification factor would be applied to the amount of noise calculated by noise compensation calculator 116, in order to maintain the total amount of noise being applied.

In some embodiments, the noise applicator 118 can be configured to vary the frequency of the noise that is being added back to the blurred image. This is because smaller amounts of blur (e.g., small blur neighborhoods) tend to remove high frequency noise (e.g., smaller structure noise or fine grained noise) and generally leave lower frequency noise (e.g., larger structure noise or coarse grained noise) intact. As such, if full frequency noise is applied to areas of a blurred image that have had only a small amount of blur applied to them, then the amount of low frequency noise would be artificially boosted. Consequently, in these embodiments, noise applicator 118 can be configured to add mostly high frequency noise to areas of an image that have had only a small amount of blur applied to them and can gradually transition from high frequency noise to full frequency noise as the amount of blur increases in order to feather the noise frequency across the image. As an example, for a field blur of radius 1, the noise being added would be mostly high frequency noise, because at radius 1, the amount of blur applied is relatively small. For a field blur of radius 3, the high frequency mix would be reduced by approximately 33% because the amount of blur applied has increased. For a field blur of radius 5, the noise would be almost entirely full frequency noise because the amount of blur is relatively large.

The noise frequency feathering can be accomplished by applying a blend of high frequency noise and full frequency noise. The high frequency noise can be generated from the full frequency noise by performing a high pass filtering on the full frequency noise. High pass filtering can be accomplished by blurring a copy of the full frequency noise (e.g., using a Gaussian blur with radius 2) and subtracting the blurred noise from the original.

In addition to the above considerations, typical image processing involves brightening of the image and conversion of the image to a common color space (e.g., ADOBE® RGB 1998, sRGB, etc.). This processing tends to make noise levels uniform in shadows and midtones within the image while reducing the noise levels within highlights. As such, highlights (e.g., areas of high signal level) in the processed image generally have the lowest levels of noise once processed. When applying noise to blurred digital image 108, it may look unnatural to add the same level of noise in the highlights. As such, noise applicator 118 can, in some embodiments, be configured to reduce the amount of noise applied to the highlights within blurred digital image 108. This could be accomplished programmatically (e.g., by automatically reducing the amount of noise applied to the highlights of blurred digital image 108 by a predefined percentage) or based on a user setting (e.g., through a slider that reduces the percentage of noise that is to be applied to the highlights). For example, if the user selects a value of 65% for the highlights, then the noise applicator 118 will reduce the amount of noise applied to the highlights to 65% of what noise application 118 would have applied without such a user setting.

In addition, in some embodiments, noise applicator 118 can be configured to stylize the noise being added back in. For instance, the noise applicator can be configured to selectively apply the noise as uniform noise or Gaussian noise based on user input.

FIG. 2 depicts an illustrative box blur being applied to a digital image 202, in accordance with various embodiments of the present disclosure. To accomplish the depicted box blur, a blur neighborhood (e.g., blur neighborhood 204) is defined for each pixel (e.g., pixel 206) that is to be blurred within digital image 202. As can be seen, blur neighborhood 204 identifies a neighborhood, or grouping, of pixels within digital image 202 whose values are to be averaged together to provide a new, or blurred, value for pixel 206. The blurred value for pixel 206 represents the value assigned to the corresponding pixel in the resulting blurred digital image 208. It will be appreciated that, if more pixels were included within blur neighborhood 204 the amount of blur would be correspondingly greater.

Each of the pixels within blur neighborhood 204 of pixel 206 can be considered a different source, of both noise and signal. By averaging these different sources together to arrive at the blurred value for pixel 206, the amount of noise is reduced. As discussed in reference to FIG. 1, where, as depicted, the individual pixels within the blur neighborhood 204 for pixel 206 are assumed to be subject to the same noise deviation and contribute equally to the blurred value for pixel 206, the following equation can be utilized to accurately estimate the amount of noise remaining in the corresponding pixel of blurred digital image 208:

$$\sigma_r = \frac{\sigma_i}{\sqrt{n}},$$

where $\sigma_r$ represents the remaining amount of noise; $\sigma_i$ represents the input amount of noise, or input noise sigma, for the different sources; and n, again, represents the number of sources. As depicted, the input amount of noise, $\sigma_i$, has a value of 20 and the number of sources, or pixels, within the blur neighborhood is 9. As such, in the depicted example, the amount of noise remaining after the application of the box blur can be estimated by the following calculation:

$$\sigma_r = \frac{20}{\sqrt{9}} = 6.67.$$

It will be appreciated that, because the noise across digital image 202 is represented by random plus or minus deviations from the value (e.g., RGB value) of each pixel, it can be assumed that each pixel within digital image 202 is subject to the same noise deviation. As such, the above equation can be utilized to estimate the amount of noise remaining within any pixel of blurred digital image 208.

Taking into account the noise remaining after the application of the box blur, 6.67, and the input noise sigma, 20, an amount of noise that would need to be added to blurred digital image 208 to re-noise blurred digital image 208 can be calculated utilizing the equation:

$$\sigma_A = \sqrt{\sigma_i^2 - \sigma_r^2},$$

where $\sigma_A$ represents the amount of noise that needs to be added; $\sigma_i$ represents the input noise sigma, or target noise sigma; and $\sigma_r$ represents the amount of noise remaining after a blur has been applied. As such, in the depicted example, the amount of noise that needs to be added to each pixel of blurred digital image 208 can be estimated by the following calculation: $\sigma_A = \sqrt{20^2 - 6.67^2} = \sqrt{355.51} = 18.86$.

FIG. 3 depicts an illustrative lens blur being applied to a digital image, in accordance with various embodiments of the present disclosure. To accomplish the depicted lens blur, a blur neighborhood (e.g., blur neighborhood 304) is defined for each pixel that is to have the depicted lens blur applied within digital image 302. The values within each pixel location of blur neighborhood 304 depict an assigned weight for that respective pixel that indicates how much the value for each individual pixel in the blur neighborhood contributes to the resulting blurred value for the selected pixel (the center pixel). Each of the pixels within blur neighborhood 304 can be considered a different source, of both noise and signal. By averaging these different sources together, in accordance with the assigned weights, to arrive at the blurred value for a selected pixel, the amount of noise is reduced. As discussed in reference to FIG. 1, where, as depicted, the individual pixels within the blur neighborhood 304 are assumed to be subject to the same noise deviation and contribute to the blurred value in accordance with the assigned weights, the following equation can be utilized to accurately estimate the amount of noise remaining in the corresponding pixel of blurred digital image 306:

$$\sigma_r = \sigma_i * \sqrt{w_1^2 + w_2^2 + \ldots w_n^2},$$

where, again, $\sigma_r$ represents the remaining amount of noise; $\sigma_i$ represents the input amount of noise, or input sigma, for the various sources; n represents the number of sources; and w represents the respective weight of each source. As depicted, the input amount of noise, $\sigma_i$, has a value of 20 and the respective weight of each source is 0.075, 0.139, 0.075, 0.139, 0.144, 0.139, 0.075, 0.139, and 0.075, going from right to left and top to bottom in the blur neighborhood within the blur neighborhood. As such, in the depicted example, the amount of noise remaining after the application of the box blur can be estimated by the following calculation: $\sigma_r = 20 * \sqrt{0.075^2 + 0.139^2 + 0.075^2 + 0.139^2 + 0.144^2 + 0.139^2 + 0.075^2 + 0.139^2 + 0.075^2} = 6.94$. It will be appreciated that, because the noise across digital image 302 is represented by random plus or minus deviations from the proper value (e.g., RGB value) of each pixel, it can be assumed that each pixel within digital image 302 is subject to the same noise deviation. As such, the above equation can be utilized to estimate the amount of noise remaining within any pixel of blurred digital image 306.

Taking into account the noise remaining after the application of the lens blur, 6.94, and the input noise sigma, 20, an amount of noise that would need to be added to blurred digital image 306 to re-noise blurred digital image 306 can be calculated utilizing the equation:

$$\sigma_A = \sqrt{\sigma_i^2 - \sigma_r^2},$$

where $\sigma_A$ represents the amount of noise that needs to be added; $\sigma_i$ represents the input noise sigma, or target noise sigma; and $\sigma_r$ represents the amount of noise remaining after a blur has been applied. As such, in the depicted example, the amount of noise that needs to be added to each pixel of blurred digital image 208 can be estimated by the following calculation: $\sigma_A = \sqrt{20^2 - 6.94^2} = \sqrt{351.84} = 18.75$.

FIG. 4 depicts another illustrative lens blur being applied to a digital image 402 along with a re-noised version of the digital image 408, in accordance with various embodiments of the present disclosure. To accomplish the depicted lens blur, a blur neighborhood (e.g., blur neighborhood 406) is defined for each pixel that is to have the depicted lens blur applied within digital image 402. The values within each pixel location of blur neighborhood 406 depict an assigned weight for that respective pixel that indicates how much the value for each individual pixel in the blur neighborhood contributes to the resulting blurred value for the selected pixel (the center pixel). Each of the pixels within blur neighborhood 406 can be considered a different source, of both noise and signal. By averaging these different sources together, in accordance with the assigned weights, to arrive at the blurred value for a selected pixel, the amount of noise is reduced. As discussed in reference to FIG. 1, where, as depicted, the individual pixels within the blur neighborhood 406 are assumed to have the same amount of noise and contribute to the blurred value in accordance with the assigned weights, the following equation can be utilized to accurately estimate the amount of noise remaining in the corresponding pixel of blurred digital image 404:

$$\sigma_r = \sigma_i * \sqrt{w_1^2 + w_2^2 + \ldots w_n^2},$$

where, again, $\sigma_r$ represents the remaining amount of noise; $\sigma_i$ represents the input amount of noise, or input sigma, for the various sources; n represents the number of sources; and w represents the respective weight of each source. As depicted, the input amount of noise, $\sigma_i$, has a value of 20 and the respective weight of each source is indicated by the value in each location of blur neighborhood 406. As such, in the depicted example, the amount of noise remaining after the application of the box blur can be estimated to be $\sigma_r = 6.94$. It will be appreciated that, because the noise across digital image 402 is represented by random plus or minus deviations from the proper value (e.g., RGB value) of each pixel, it can be assumed that each pixel within digital image 402 is subject to the same noise deviation. As such, the above equation can be utilized to estimate the amount of noise remaining within any pixel of blurred digital image 404.

Taking into account the noise remaining after the application of the lens blur, 5.047, and the input noise sigma, 20, an amount of noise that would need to be added to blurred digital image 306 to produce re-noised image 408 can be calculated utilizing the equation:

$$\sigma_A = \sqrt{\sigma_i^2 - \sigma_r^2},$$

where $\sigma_A$ represents the amount of noise that needs to be added; $\sigma_i$ represents the input noise sigma, or target noise sigma; and $\sigma_r$ represents the amount of noise remaining after a blur has been applied. As such, in the depicted example, the amount of noise that needs to be added to each pixel of blurred digital image 404 can be estimated by the following calculation: $\sigma_A = \sqrt{20^2 - 5.02^2} = 19.35$.

Figure 5:
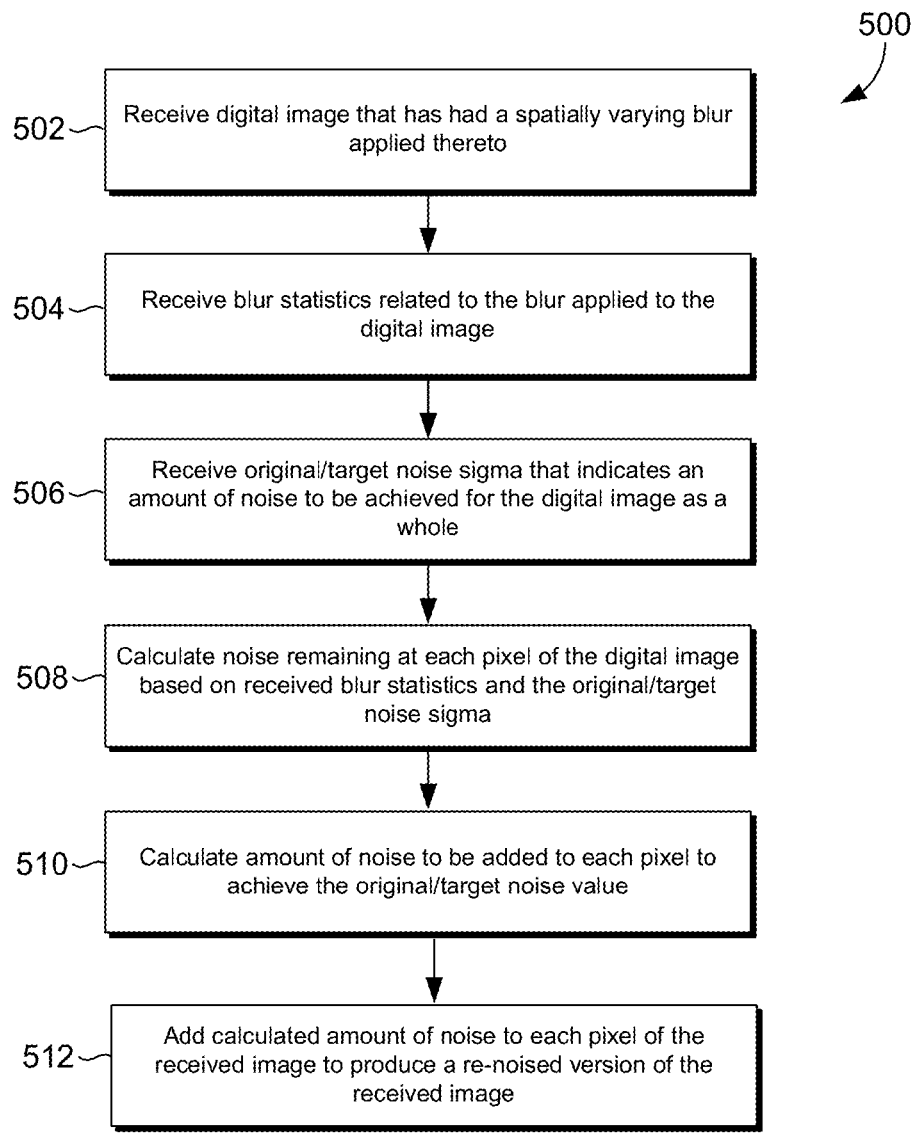
FIG. 5 depicts a process flow showing an illustrative method for re-noising a digital image, in accordance with various embodiments of the present disclosure.

FIG. 5 depicts a process flow 500 showing an illustrative method for re-noising a digital image, in accordance with various embodiments of the present disclosure. Process flow 500 could be carried out by a graphics editor, such as, for example, graphics editor 102 of FIG. 1. Initially, the process flow begins at block 502 where a digital image that has had a spatially varying blur applied thereto is received Such a blurred digital image could be produced, for example, utilizing blur module 106 of FIG. 1, in accordance with the process described in reference to blur module 106.

At block 504, blur statistics can be received. These blur statistics can include any information related to the blur that was applied to the digital image received at block 502. In some embodiments, this information could indicate an amount of blur applied to each individual pixel of the digital image. In such embodiments, blur statistics could include the blur neighborhoods for each pixel that would be representative of the amount of blur applied to each individual pixel. In other embodiments, blur statistics could indicate an amount of noise remaining at each pixel location as a result of the blur applied thereto.

At block 506 an original, input, or target noise sigma associated with the digital image received at block 502 can be received. In some embodiments, this target noise sigma could be received as a part of the blur statistics received at block 504. In such embodiments, it will be appreciated that block 506 could be omitted. In other embodiments, the target noise sigma could be specified by a user (e.g., via a graphics editor). In still other embodiments, the target noise sigma could be calculated based on an amount of noise contained within the original digital image prior to the application of the spatially varying blur, if that original digital image is accessible.

At block 508 the noise remaining at each pixel of the digital image is calculated based on the received blur statistics and the target noise sigma. As mentioned above, in some embodiments, the blur statistics can include the blur neighborhoods for each pixel of the received digital image. These blur neighborhoods would be representative of the amount of blur applied to each pixel. The individual pixels that fall within the blur neighborhood for a selected pixel are assumed to have the same amount of noise and can either contribute equally or in accordance with an assigned weight to the blurred value of the selected pixel. In embodiments, where the pixels that fall within the blur neighborhood for a selected pixel contribute equally to the blurred value of the selected pixel, the following equation can be utilized to determine an amount of noise remaining within the selected pixel:

$$\sigma_r = \frac{\sigma_i}{\sqrt{n}},$$

where $\sigma_r$ represents the remaining amount of noise; $\sigma_i$ represents the input amount of noise, or target noise sigma; and n represents the number of sources. An example of such a calculation is discussed in reference to FIG. 2, above. In embodiments, where the pixels that fall within the blur neighborhood for a selected pixel contribute in accordance with an assigned weight to the blurred value of the selected pixel, and the assigned weights are normalized, the following equation can be utilized to determine an amount of noise remaining within the selected pixel:

$$\sigma_r = \sigma_i * \sqrt{w_1^2 + w_2^2 + \ldots w_n^2},$$

where, again, $\sigma_r$ represents the remaining amount of noise; $\sigma_i$ represents the input amount of noise, or input sigma, for the various sources; n represents the number of sources; and w represents the respective weight of each source. An example of such a calculation is discussed in reference to FIGS. 3 and 4, above. For non-normalized weights the root of the sum of squares of the weights can be divided by the sum of the weights, which would yield the equation:

$$\sigma_r = \sigma_i * \frac{\sqrt{w_1^2 + w_2^2 + \dots w_n^2}}{\sum_{i=1}^{n} w_i}.$$

At block 510, an amount of noise to be added to each pixel of the received digital image to achieve the target noise sigma, based on the amount of noise remaining within each pixel, is calculated. This amount is also referred to herein as a noise compensation value. It is important to note that, as discussed in reference to FIG. 1, adding noise from different sources sums according to the root sum of squares. Because of this, the net effect of adding two different noise sources together results in some of the noise being cancelled. The amount of noise resulting from the summing of noise sources can be accurately estimated utilizing the equation $$\sigma_r = \sqrt{\sigma_1^2 + \sigma_2^2 + \dots \sigma_n^2},$$

where $\sigma_r$ is the resulting noise sigma, and n is the number of noise sources. As a result, it would not be accurate to merely take the difference between the target noise sigma and the amount of noise remaining at each pixel location that was calculated at block 508 to determine an amount of noise that would compensate for the amount of noise lost in the blurring process applied to the digital image. An example of this noise cancellation is discussed in reference to FIG. 1. Because of the noise cancellation effect of summing noise sources, the amount of noise to add to each pixel can be calculated utilizing the following equation:

$$\sigma_A = \sqrt{\sigma_i^2 - \sigma_r^2},$$

where $\sigma_A$ represents the amount of noise that needs to be added; $\sigma_i$ represents the input noise sigma, or target noise sigma; and $\sigma_r$ represents the amount of noise remaining after a blur has been applied.

At block 512, the calculated amount of noise, $\sigma_A$, for each pixel is added back to re-noise the received digital image. To accomplish the addition of the calculated amount of noise, a two dimensional noise buffer can be generated as random plus or minus values with a fixed standard deviation. The noise buffer can then be overlaid onto the received digital image. In embodiments, the noise buffer is overlaid by, at each pixel location within received digital image, scaling the noise value from the noise buffer according to the calculated amount of noise for the respective pixel location. The scaled noise value is then added to the value of the respective pixel. It will be appreciated that additional considerations, such as the addition of color noise, noise feathering, addition of noise to highlights can all be accomplished at block 512 in the same manner as these considerations are described in reference to FIG. 1.

Figure 6:
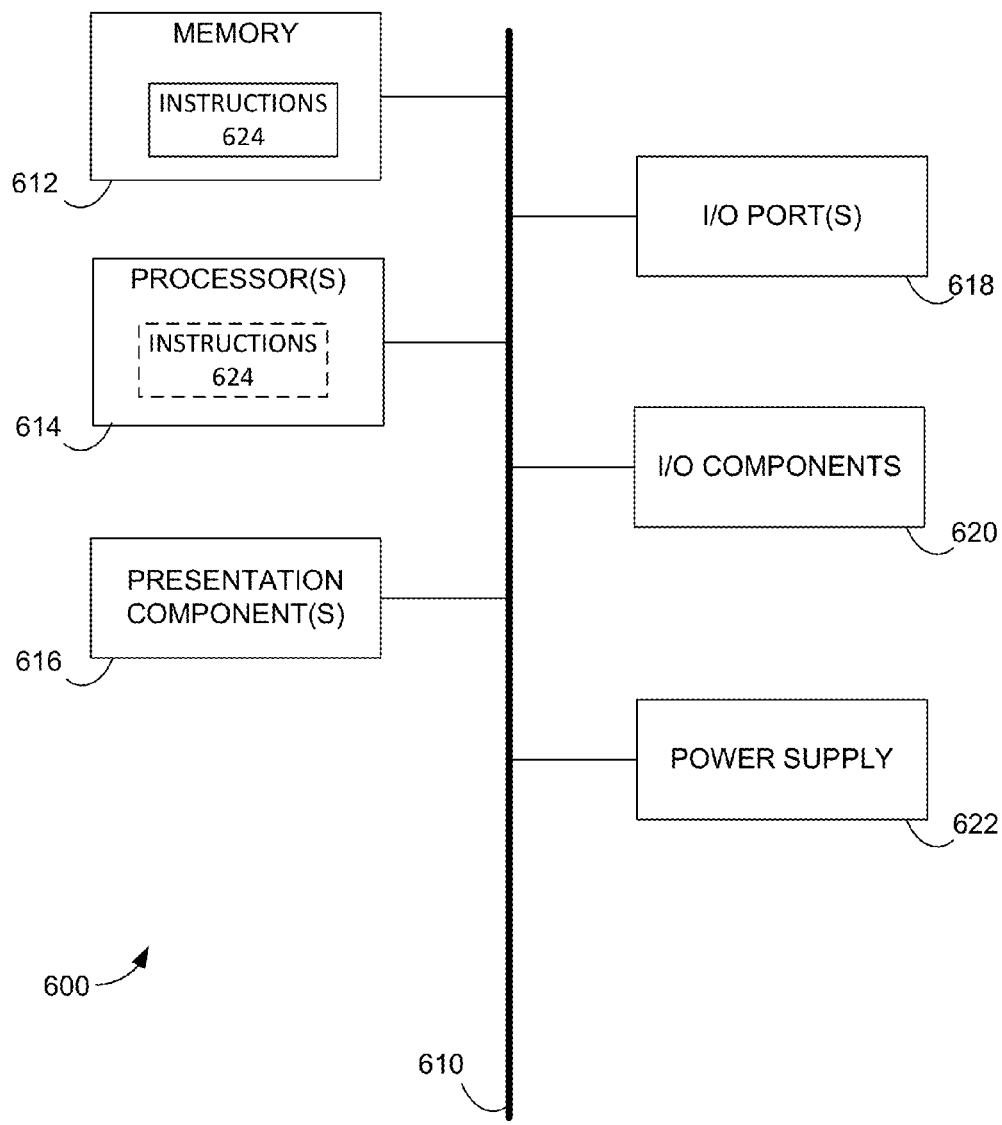
FIG. 6 is a block diagram of an example computing device in which embodiments of the present disclosure may be employed.

Having described embodiments of the present invention, an example operating environment in which embodiments of the present invention may be implemented is described below in order to provide a general context for various aspects of the present invention. Referring to FIG. 6, an illustrative operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 6, computing device 600 includes a bus 610 that directly or indirectly couples the following devices: memory 612, one or more processors 614, one or more presentation components 616, input/output ports 618, input/output components 620, and an illustrative power supply 622. Bus 610 represents what may be one or more busses (such as an address bus, data bus, or combination thereof). Although the various blocks of FIG. 6 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 6 is merely illustrative of an example computing device that can be used in connection with one or more embodiments of the present disclosure. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer storage media in the form of volatile and/or nonvolatile memory. As depicted, memory 612 includes instructions 624. Instructions 624, when executed by processor(s) 614 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 600 includes one or more processors that read data from various entities such as memory 612 or I/O components 620. Presentation component(s) 616 present data indications to a user or other device. Illustrative presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. One or more non-transitory computer-readable storage media having instructions stored thereon, which, when executed by one or more processors of a computing device, provide the computing device with a graphics editor to:
    calculate a noise reduction factor for each of a plurality of pixels of a digital image that have had a blur applied thereto, wherein the noise reduction factor for a respective pixel is indicative of an estimated reduction in noise that results from an amount of blur applied to the respective pixel;
    determine a noise compensation value for each of the plurality of pixels based on the noise reduction factor calculated for each pixel and a target noise level for the digital image; and
    apply noise to each of the plurality of pixels in accordance with the noise compensation value determined for each of the plurality of pixels.

2. The one or more computer-readable storage media of claim 1, wherein the blur applied to the plurality of pixels is a spatially varying blur.

3. The one or more computer-readable storage media of claim 1, wherein the amount of blur applied to each of the plurality of pixels is based on a group of pixels defined within a blur neighborhood associated with each of the plurality of pixels.

4. The one or more computer-readable storage media of claim 3, wherein to calculate the noise reduction factor for each of the plurality of pixels is based on a root of a sum of squares calculation that is based on the number of pixels defined within the blur neighborhood associated with each of the plurality of pixels.

5. The one or more computer-readable storage media of claim 3, wherein each pixel of the group of pixels defined within the blur neighborhood is assigned a weight and wherein the amount of blur applied to each of the plurality of pixel is further based on respective weights of the number of pixels defined within the respectively associated blur neighborhood.

6. The one or more computer-readable storage media of claim 5, wherein to calculate the noise reduction factor for each of the plurality of pixels is based on a root of a sum of squares calculation utilizing the respective weights of the group of pixels.

7. The one or more computer-readable storage media of claim 4, wherein the target level of noise is user defined.

8. The one or more computer-readable storage media of claim 4, wherein the target level of noise is calculated from the digital image prior to the application of the blur.

9. The one or more computer-readable storage media of claim 1, wherein to determine the noise compensation value for each of the plurality of pixels is based on a root of a sum squares calculation that is based on the noise reduction factor calculated for each pixel and a target noise level for the digital image.

10. The one or more computer-readable storage media of claim 1, wherein to apply noise to each pixel in accordance with the noise compensation value determined for the respective pixel in accordance with the respectively calculated noise compensation value is further to transition from applying high frequency noise to full frequency noise as the amount of blur increases.

11. The one or more computer-readable storage media of claim 1, wherein to apply noise to each pixel in accordance with the noise compensation value includes:
 determination of an amplification factor based on a selected percentage of noise to apply as color noise; and
 application of the selected percentage of the noise as color noise and a remaining percentage of the noise as luminance noise in accordance with the amplification factor.

12. The one or more computer-readable storage media of claim 1, wherein to apply noise to each pixel in accordance with the noise compensation value includes: reduction of noise applied to pixels that fall within a highlight region of the digital image in accordance with a selected percentage that is applied to the noise compensation value.

13. A computer-implemented method of re-noising blurred images comprising:
 calculating a noise reduction factor for each of a plurality of pixels of a digital image that have had a spatially-varying blur applied thereto, wherein the noise reduction factor for a respective pixel is indicative of an estimated reduction in noise resulting from an amount of blur applied to the respective pixel;
 determining a noise compensation value for each of the plurality of pixels based on the noise reduction factor calculated for each pixel and a target noise level for the digital image; and
 applying noise to each of the plurality of pixels in accordance with the noise compensation value determined for each of the plurality of pixels.

14. The method of claim 13, wherein the amount of blur applied to each of the plurality of pixels is based on a group of pixels defined within a blur neighborhood associated with each of the plurality of pixels.

15. The method of claim 14, wherein calculating the noise reduction factor for each of the plurality of pixels is based on a root of a sum of squares calculation that is based on the number of pixels defined within the blur neighborhood associated with each of the plurality of pixels.

16. The method of claim 14, wherein each pixel of the group of pixels defined within the blur neighborhood is assigned a weight and wherein the amount of blur applied to each of the plurality of pixel is further based on respective weights of the number of pixels defined within the respectively associated blur neighborhood.

17. The method of claim 16, wherein calculating the noise reduction factor for each of the plurality of pixels is based on a root of a sum of squares calculation utilizing the respective weights of the group of pixels.

18. The method of claim 13, wherein determining the noise compensation value for each of the plurality of pixels is based on a root of a sum squares calculation that is based on the noise reduction factor calculated for each pixel and a target noise level for the digital image.

19. A computing system for re-noising blurred images comprising:
 one or more processors; and
 one or more computer-readable storage media, coupled with the one or more processors, having instructions stored thereon, which, when executed by the one or more processors, provide the computing system with a graphics editor to:
  determine a noise reduction factor for each of a plurality of pixels of a digital image that have had a spatially-varying blur applied thereto, wherein the noise reduction factor for a respective pixel is indicative of an estimated reduction in noise resulting from an amount of blur applied to the respective pixel and is based on a root of a sum of squares calculation applied to blur statistics associated with the respective pixel;
  determine a noise compensation value for each of the plurality of pixels based on the noise reduction factor calculated for each pixel and a target noise level for the digital image; and
  apply noise to each of the plurality of pixels in accordance with the noise compensation value determined for each of the plurality of pixels.

20. The computing system of claim 19, wherein to determine the noise compensation value for each of the plurality of pixels is based on a root of a sum squares calculation that is based on the noise reduction factor calculated for each pixel and a target noise level for the digital image.

* * * * *